Patented Sept. 8, 1936

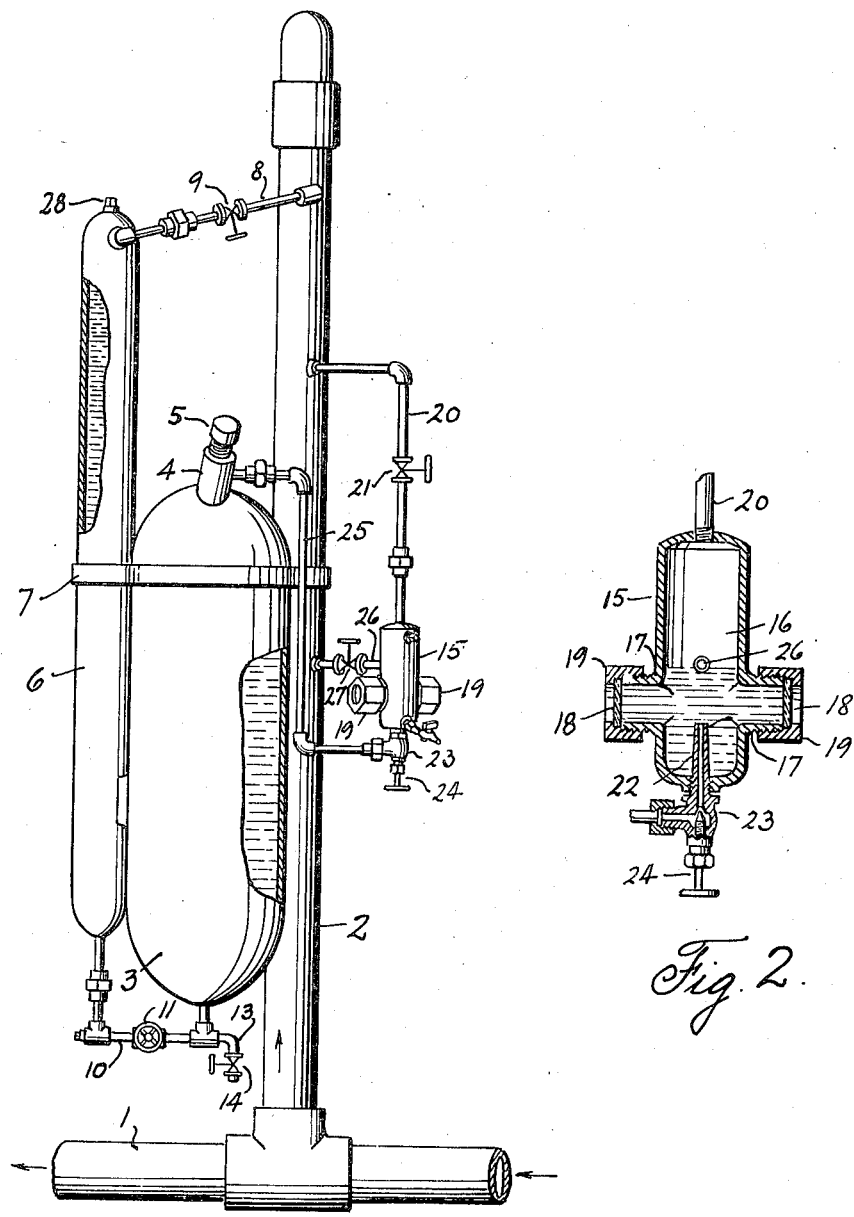

2,053,362

UNITED STATES PATENT OFFICE 2,053,362

LUBRICATOR

Walter K. Canan, Houston, Tex.

Application July 1, 1935, Serial No. 29,297

2 Claims. (Cl. 184—50)

This invention relates to a lubricator.

An object of the invention is to provide a sight-feed steam lubricator specially designed for delivering a lubricant to a steam line for lubricating the driven mechanism with which the steam line is connected.

Another object of the invention is to provide a sight-feed steam line lubricator whereby the lubricant may be continuously fed into the steam line in a vaporized form so as to readily reach and lubricate the moving parts of the steam driven mechanism.

Another object of the invention is to provide a lubricator of the character described whereby the feed of the lubricant may be readily controlled.

Another object is to provide a sight-feed lubricator of the character described so arranged that the feed of the lubricant may be readily observed.

A still further feature is to provide a sight-feed steam line lubricator that is of very simple construction, may be easily and cheaply produced, and readily installed and which is very durable and efficient.

With the above and other objects in view, the invention has particular relation to certain novel features of construction, operation, and arrangement of parts, an example of which is given in this specification and illustrated in the accompanying drawing, wherein:—

Fig. 1 shows a side elevation of the lubricator installed on the steam line, and shown partly in section, and Fig. 2 shows an enlarged vertical sectional view of the feed-controlling valve mechanism.

In the drawing the numeral 1 designates a steam line through which steam may be delivered from a suitable source to an engine, pump, or other driven mechanism. A standpipe 2 is connected into, and upstands from, the line 1 and its upper end is closed. Arranged adjacent the standpipe is the suitable lubricant container 3 having the filling tube 4 at its upper end normally closed by a removable plug 5. Adjacent the lubricant container 3 there is a water tank 6 preferably smaller in transverse diameter than the container 3 and extended upwardly above said container.

The standpipe, container, and tank, may be clamped together by means of a surrounding clamp 7 and beneath said clamp the container 3 may be welded at one point to the stand pipe 2 and the tank may be welded at one point to said container.

The clamp 7 is secured firmly to the container 3 but is not fitted around the standpipe 2 and the tank 6 so tightly but that there may be sufficient movement to permit the required expansion of the parts, held together by the clamp, due to variations in temperature, and thus preventing the breaking of the welds.

The upper end of the stand pipe is connected into the upper end of the tank by the pipe 8 which has a suitable control valve 9 incorporated therein, and the lower end of the tank is connected into the lower end of the container 3 by the pipe 10 which has the control valve 11 incorporated therein and which also has the drain outlet 13 controlled by the valve 14 whereby the lubricant container may be drained of sediment from time to time.

There is a shell 15 containing the sight-feed chamber 16, said shell having the outwardly threaded, aligned nipples 17, 17 whose outer ends are closed by the transparent disks 18, 18, which are clamped in place by the flange nuts 19, 19.

A pipe 20 leads from the top of the shell 15 and enters the standpipe 2 at a point above said shell, and this pipe 20 is controlled by the valve 21. Threaded into the lower end of the shell 15 there is an oil nozzle 22 whose outer end is formed with the valve casing 23 which is provided with the regulating needle valve 24. An oil conducting pipe 25 leads from the filler tube 4 and enters the valve casing 23. A feed pipe 26 leads from the chamber 16, slightly above the nipple 17, and enters the stand pipe 2 and is equipped with the shut-off valve 27. In operation, the valve 11 may be closed and the plug 5 removed, and the container 3 filled with a lubricant. The valve 11 may be then opened. The stand pipe 2 is filled with steam under pressure and this steam passes through the pipe 8 into the water tank 6 and will gradually condense in said water tank and fill the same with water. If desired, however, the plug 28 at the top of the water tank may be removed and the water tank filled with water before opening the valve 11. Until the tank 6 is filled with water above the level of the upper end of the container 3, the lubricant in the container 3 will be subjected to equal pressures from opposite sides, and the lubricant will not be fed—that is, the pressure of steam exerted against the lubricant through the pipe 10 and that exerted through the pipes 20 and 25 will be approximately the same. However, when the water tank 6 is full, or approximately full, of water, the added pressure of the weight of the water in the tank exerted through the pipe 10 against the lubricant in the container 3 will gradually force the lubricant through the pipe 25 and the nozzle 22 in drops. Steam will also condense in the shell 15 and collect therein in the form of water up to the level of the pipe 26. The lubricant will bubble through the water in the chamber 16 and can be readily observed and will pass through the pipe 26 into the standpipe 2 in the form of a vapor, and this feeding of the lubricant will be a substantially continuous process. The vaporized lubricant will gradually pass from the standpipe 2 into the stream of steam passing through the steam pipe 1 and will be conducted to the moving parts of the driven mechanism to lubricate the same. The condensed steam in the chamber 16 will be at a high temperature and will keep the water in the bottom of said chamber as well as the nozzle 22 hot so that said nozzle will not become clogged with the lubricant as might be the case if the nozzle 22 were cold.

The feed of the lubricant, as is obvious, may be regulated by the regulating valve 24.

The drawing and description disclose what is now considered to be a preferred form of the invention by way of illustration only, while the broad principle of the invention will be defined by the appended claims.

What I claim is:

1. A lubricator comprising a standpipe adapted to be connected to a steam-conducting line, a lubricant container arranged alongside the standpipe, a water tank arranged alongside the container, a conduit connecting the lower portions of the tank and container, a valve controlling said conduit, a steam-conducting pipe connecting the standpipe with the upper portion of the tank, a shell enclosing a chamber and having oppositely arranged transparent sections in the walls thereof, a lubricant-conducting pipe leading from the upper portion of the container and terminating in a discharge nozzle which extends from beneath upwardly into said chamber, a valve controlling said nozzle, a feed pipe leading from the chamber above the nozzle into the standpipe, an equalizing steam pipe leading from the upper portion of the chamber and connection into the standpipe above, a clamp fitted around the container, standpipe and tank, and secured firmly to one of said elements, but loosely to the other two of said elements so as to permit independent movement thereof, said container, standpipe and tank being fixed together beneath the clamp whereby said three parts will be maintained assembled, but permitted to independently expand under variations in temperature.

2. A lubricator comprising a standpipe adapted to be connected to a steam conducting line, a lubricant container arranged alongside the standpipe, a water tank arranged alongside the container, a conduit connecting the lower portions of the tank and container, a valve controlling said conduit, a steam conducting pipe connecting the standpipe with the upper portion of the tank, a shell enclosing a chamber and having oppositely arranged transparent sections in the walls thereof, a lubricant conducting pipe leading from the upper portion of the container and terminating in a discharge nozzle which extends from beneath upwardly into said chamber, a valve controlling said nozzle, a feed pipe leading from the chamber above the nozzle into the standpipe, and equalizing steam pipe leading from the upper portion of the chamber and connecting into the standpipe above, a clamp so fitted around the container, standpipe and tank as to permit independent movement thereof, said container, standpipe and tank being fixed together beneath the clamp whereby said three parts will be maintained assembled, but permitted to independently expand under variations in temperature.

WALTER K. CANAN.